United States Patent [19]

Hirose et al.

[11] Patent Number: 4,745,536

[45] Date of Patent: May 17, 1988

[54] REACTOR FOR CIRCUIT CONTAINING SEMICONDUCTOR DEVICE

[75] Inventors: Yorio Hirose; Yasunobu Sakamizu, both of Tokyo, Japan

[73] Assignee: Tokyo Shibaura Denki Kabushiki Kaisha, Kawasaki, Japan

[21] Appl. No.: 936,934

[22] Filed: Dec. 1, 1986

Related U.S. Application Data

[63] Continuation of Ser. No. 744,660, Jun. 14, 1985, abandoned, and a continuation of Ser. No. 563,982, Dec. 21, 1983, abandoned.

[30] Foreign Application Priority Data

Dec. 23, 1982 [JP] Japan ............................... 57-230398

[51] Int. Cl.[4] ............................................ H02M 3/335

[52] U.S. Cl. ......................................... 363/21; 363/39; 363/53

[58] Field of Search ....................... 363/19, 20, 21, 22, 363/23, 24, 25, 39, 44, 45, 46, 47, 48, 50, 53, 86, 126; 323/356, 359, 363; 361/110, 111; 148/105, 108, 113, 403; 336/213, 218, 233; 333/181; 455/307

[56] References Cited

U.S. PATENT DOCUMENTS

| | | | |
|---|---|---|---|
| 4,221,592 | 9/1980 | Ray | 75/122 |
| 4,262,233 | 4/1981 | Becker et al. | 315/248 |
| 4,314,594 | 2/1982 | Pfeifer et al. | 428/629 |
| 4,363,067 | 12/1982 | Radomski | 363/20 |
| 4,411,716 | 10/1983 | Shiiki et al. | 148/403 |
| 4,420,348 | 12/1983 | Shiiki et al. | 148/31.55 |
| 4,424,459 | 1/1984 | Inomata et al. | 148/403 |
| 4,439,253 | 3/1984 | Ramanan | 148/403 |
| 4,451,876 | 5/1984 | Ogata | 363/21 |

FOREIGN PATENT DOCUMENTS

| | | |
|---|---|---|
| 086485 | 2/1983 | European Pat. Off. . |
| 0072574 | 2/1983 | European Pat. Off. . |
| 2708151 | 9/1977 | Fed. Rep. of Germany . |
| 2806052 | 11/1978 | Fed. Rep. of Germany . |
| 2855858 | 7/1979 | Fed. Rep. of Germany . |
| 2824749 | 12/1979 | Fed. Rep. of Germany . |
| 3021536 | 12/1980 | Fed. Rep. of Germany . |
| 2924280 | 1/1981 | Fed. Rep. of Germany . |
| 2317370 | 11/1975 | France . |
| 7512294 | 10/1975 | Netherlands . |
| 7807836 | 7/1978 | Netherlands . |
| 424425 | 2/1935 | United Kingdom . |

OTHER PUBLICATIONS

Patent Abstracts of Japan, vol. 6, No. 164 (E-127)(1042), 27 Aug. 1982, blz. 1042 E127 & JP.-A-57-83-005, (Hitachi Kinzoku)(24-05-1982).

Proceedings of Powercon 8, Dallas, Texas, Apr. 27-30, 1981.

Elektronik, No. 3, 1981, pp. 43-50, Induktive Bauelemente der Leistungselektronik, Karl-Heinz Bretthauer et al.

Technical Communication, Krupp Research Reports, vol. 40, 1982, Amorphe Metalle-Weichmagnetische Werkstoffe Mit Zukunft-W. Jaschinski.

*Primary Examiner*—Patrick R. Salce
*Assistant Examiner*—Judson H. Jones
*Attorney, Agent, or Firm*—Cushman, Darby & Cushman

[57] ABSTRACT

Apparatus and method for effectively decreasing current spike, ringing, and electromagnetic noise in a circuit containing a semiconductor device when a voltage applied to the semiconductor is inverted. The core of the reactor is made of an amorphous magnetic alloy having a magnetic flux density of not less than 6 kilogauss at an external magnetic field of 1 oersted, a coercive force of not more than 0.5 oersted, and a squareness ratio of not less than 0.8 when a frequency is set to be 100 kilohertz. The reactor includes the core having a through hole and conductor wound around the core through the through hole. The core is insulated from the conductor.

19 Claims, 1 Drawing Sheet

REACTOR FOR CIRCUIT CONTAINING SEMICONDUCTOR DEVICE

This is a continuation of application Ser. No. 744,660 filed June 14, 1985 now abandoned and a continuation of Ser. No. 563,982 filed Dec. 21, 1983 now abandoned.

BACKGROUND OF THE INVENTION

I. Field of the Invention

The present invention relates to apparatus and method for using a reactor in a circuit containing a semiconductor device.

II. Description of the Prior Art

In general, when the polarity of a voltage applied to a semiconductor device such as a diode is abruptly inverted, the diode temporarily loses its initial function, so that a reverse current flows therethrough. Although the diode recovers its initial function after a short period of time (recovery time), the diode may break down if the reverse current (i.e., a spike current) is large. Furthermore, when resonant elements such as a coil and a capacitor are used in a circuit in which a current spike occurs, the current spike results in ringing for a considerably long period of time. The current spike and ringing disables normal operation of the circuit. Furthermore, these spurious components become noise components mixed in an output from the circuit. In addition to this disadvantage, an electromagnetic noise component is generated due to an abrupt current flow reversal. In other words, noise components are radiated in space in the form of radio waves. The current spike, ringing, and electromagnetic noise are decisive spurious components in preventing large current control in a high frequency region. This typically occurs in a semiconductor circuit such as a switching power supply circuit.

In order to eliminate the current spike, ringing and electromagnetic noise, a reactor is connected in series with a semiconductor device in the circuit. The reactor includes a core having a through hole in the vicinity of the center thereof and a conductor wound around the core through the through hole. The core is insulated from the conductor. A conventional reactor includes a ferrite or permalloy core. However, when a ferrite core is used, since a squareness ratio ($Br/B_1$) and a saturated magnetic flux density are small, the operation of the core is degraded. In order to obtain efficient operation of the core, the core size must be increased. When a permalloy core is used, it has a high coercive force (Hc) which degrades the high frequency characteristics, resulting in inconvenience.

SUMMARY OF THE INVENTION

It is, therefore, an object of the present invention to provide an apparatus and a method for effectively preventing current spike, ringing and electromagnetic noise in a circuit containing a semiconductor device by the use of a reactor.

The core of the reactor of the present invention is made of an amorphous magnetic alloy which has $B_1$ (a magnetic flux density in a magnetic field of 1 Oe) of 6 kilogauss or more, a coercive force (Hc) of 0.5 Oe or less, and a squareness ratio ($Br/B_1$) (where Br is the residual magnetic flux density) of 0.8 or more when the frequency is set to be 100 kHz. The present invention provides for apparatus and a method of using a reactor for a circuit containing a semiconductor device, the reactor including: a core which has a through hole and which is made of an amorphous magnetic alloy which has $B_1$ of 6 kilogauss or more, a coercive force of 0.5 Oe or less and a squareness ratio of 0.8 or more at a frequency of 100 kHz; and a conductor wound around the core through the through hole. The core is insulated from the conductor.

According to the present invention, a current spike, ringing, and electromagnetic noise can be effectively prevented. The apparatus and method of the present invention can be effectively used even in a high frequency region.

DETAILED DESCRIPTION OF THE PREFERRED EMBODIMENT

Figure 1:
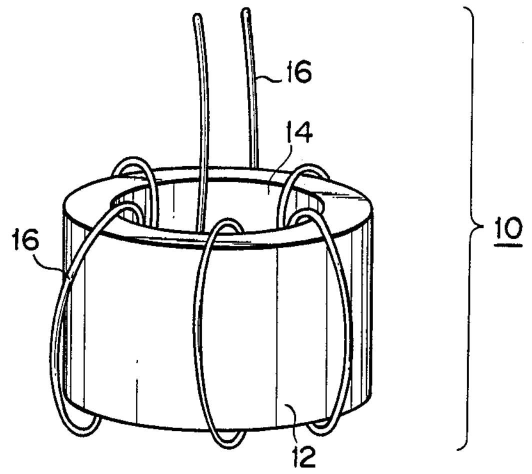
FIG. 1 is a perspective view of a reactor used in the method present invention.

As shown in FIG. 1, a reactor 10 used in the present invention includes a core 12 having a through hole 14. The outer surface of the core 12 is coated with an insulator such as resin. A single conductor 16 is wound around the core 12 through the through hole 14. The conductor 16 is also coated with resin or the like. The external appearance of the reactor used in the present invention is the same as that of a conventional reactor, and a detailed description thereof will be omitted throughout the specification.

The core of the reactor used in the present invention is made of an amorphous magnetic alloy having a value for $B_1$ of 6 kilogauss or more, a coercive force of 0.5 Oe or less and a squareness ratio of 0.8 or more at a frequency of 100 kHz. A preferred formula of the amorphous magnetic alloy is given as general formula (I) as follows:

$$Co_aM_bM'_cY_d \quad (I)$$

wherein M is at least one metal atom selected from the group consisting of iron and manganese, M' is a transition metal element (excluding iron and manganese), Y is at least one element selected from the group consisting of silicon, boron, phosphorus, carbon, germanium, zinc and aluminum, and a, b, c and d indicate atomic percent of the respective elements in the alloy so that $a+b+c+d=100$, and $50\leq a\leq 80$, $0\leq b\leq 10$, and $0\leq c\leq 10$. Preferred ranges of a, b, and c are $55\leq a\leq 75$, $2\leq b\leq 8$, $1\leq c\leq 8$. Preferred M' includes chromium, nickel, niobium, molybdenum, zirconium, tungsten, ruthenium, titanium, vanadium, tantalum, hafnium, rhenium, copper and yttrium. The element "M" in the above formula serves to reduce the magnetostriction of the amorphous alloy, so that it prevents the magnetic characteristics of the reactor from being degraded in a case where the reactor is covered with resin by molding the resin. The element "M'" in the above formula contributes to the improvement of the magnetic characteristics and the thermal stabilization of the amorphous alloy, so that it enables the reactor to be used for a long period without degrading its performance. The element "Y" in the above formula serves to make the alloy amorphous.

The core of the reactor according to the present invention can be prepared as follows. A molten metal is injected in the form of a thin film from a nozzle onto a cooled roller. By this operation an amorphous magnetic alloy ribbon having a thickness of about 10 to 50 μm is prepared (single roll method). An insulating material such as magnesium oxide powder is applied to the ribbon, so that the ribbon is insulated. The insulated ribbon is wound around a proper core tube and the tube is pulled out, thus preparing the core of the reactor of the present invention. Alternatively, the central part of the amorphous magnetic alloy ribbon obtained as described above is punched. An insulating material such as magnesium oxide powder is applied to the resultant structure. The resultant ribbons are stacked to prepare a core. The single roll method for preparing an amorphous alloy is well-known to those skilled in the art, and a detailed description thereof will be omitted.

The resultant core is coated with a resin, and an insulated single conductor is wound around the core through the through hole of the core, thus obtaining the reactor which is used in the present invention.

This reactor is generally connected in series with a semiconductor device in a circuit. Thus, a current spike or the like generated from the semiconductor device can be reduced by the reactor.

EXAMPLE 1

An amorphous magnetic alloy ribbon of $Co_{68}Fe_3Cr_3Si_{13}B_{13}$ was prepared by the single roll method. Magnesium oxide powder was applied to the ribbon. The insulated ribbon was wound around a quartz tube (having a diameter of 6 mm) for 20 turns. Thereafter, the quartz tube was removed from the wound ribbon, thus preparing a core. The core was coated with epoxy resin and was insulated. An insulated conductor was wound around the insulated core for 4 turns, thus preparing a reactor for use in the present invention.

Figure 2:
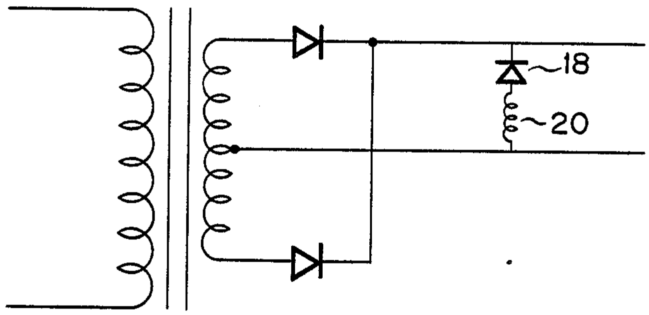
FIG. 2 is a circuit diagram of a circuit used for testing the performance of the reactor shown in FIG. 1.

As shown in FIG. 2, the resultant reactor 20 was connected in series with a diode 18 in a switching power supply circuit. Efficiency (percentage ratio of an output from a switching power supply to an input to a transformer in the circuit), a spike current, ringing, and high-frequency noise were measured when the frequency was set to be 100 kHz.

Furthermore, two insulated conductors were wound around the core, and an AC hysteresis curve at a frequency of 100 kHz was obtained by using an AC magnetic field measuring apparatus when an external magnetic field of 1 Oe was applied. According to this curve, $B_1$, the coercive force and the squareness ratio were measured.

For the purpose of comparison, the same test was conducted for reactors respectively having cores of ferrite and Permalloy. Furthermore, the test was conducted to measure the spike current, ringing and high-frequency noise when the reactor was not used in the circuit containing the semiconductor device. The obtained results are shown in Table 1 below.

TABLE 1

| | Without reactor | Example | Ferrite core | Permalloy core |
|---|---|---|---|---|
| Efficiency (%) | 77 | 78 | 75 | 74 |
| Spike current (A) | 5.4 | 0.15 | 4.4 | 2.8 |
| Ringing | Significant | None | Significant | Small |
| High-frequency noise (dB) | 0 | −22 | −3 | −5 |
| Remarks | | | | Reactor generated heat |

TABLE 1-continued

| | Without reactor | Example | Ferrite core | Permalloy core |
|---|---|---|---|---|
| $B_1$ (KG) | — | 6.4 | 3.8 | 8.0 |
| Coercive force (Oe) | — | 0.42 | 0.62 | 1.2 |
| Squareness ratio | — | 0.85 | 0.75 | 0.90 |

EXAMPLE 2

Amorphous magnetic alloy ribbons respectively having compositions shown in Table 2 were prepared by the single roll method. Each ribbon was wound to obtain a core having dimensions 7 mm×6 mm×4 mm and was heated at a temperature of 400° C. for 30 minutes. $B_1$, the coercive force and the squareness ratio were measured at a frequency of 100 kHz. The results are shown in Table 2.

The reactors were formed from these cores in the same manner as in Example 1. Each reactor was then arranged in the switching power supply circuit used in Example 1, and the efficiency was measured. The percentages in terms of efficiency of the reactors fell within the range between 78% and 80%. In this diode circuit, current spike and ringing did not occur, and normal circuit operation was obtained.

TABLE 2

| No. | Composition | $B_1$ (KG) | Hc (Oe) | $Br/B_1$ (%) |
|---|---|---|---|---|
| 1 | $Co_{67}Fe_5Ni_3Si_{10}B_{15}$ | 7.0 | 0.31 | 97.2 |
| 2 | $Co_{68}Fe_4Nb_2Si_{13}B_{13}$ | 7.2 | 0.34 | 96.8 |
| 3 | $Co_{71}Fe_2Mn_4Si_{14}B_9$ | 7.5 | 0.35 | 98.0 |
| 4 | $Co_{70}Fe_3Mo_2Ti_1Ge_9B_{15}$ | 7.2 | 0.32 | 97.0 |
| 5 | $Co_{68}Fe_5Zr_3Nb_2Si_{10}B_{10}C_2$ | 7.4 | 0.34 | 97.5 |
| 6 | $Co_{66}Fe_5W_5Si_{11}B_{11}Sn_2$ | 6.8 | 0.30 | 96.8 |
| 7 | $Co_{66}Fe_4Ru_2Si_{10}B_{18}$ | 6.3 | 0.27 | 96.8 |

While the invention has been described in connection with what is presently considered to be the most practical and preferred embodiments, it is understood that the invention is not to be limited to the disclosed embodiment but, on the contrary, is intended to cover various modifications and equivalent arrangements included within the spirit and scope of the appended claims which scope is to be accorded the broadest interpretation so as to encompass all such modifications and equivalent structures.

What is claimed is:

1. A method of restraining current spikes, ringing, and electromagnetic noise in an electric circuit that includes a semiconductor device, the current spikes, ringing and electromagnetic noise being of a type that occurs when a voltage applied to the semiconductor device is inverted, said method comprising the step of:

providing a reactor in series with said semiconductor device, wherein the reactor includes (a) a core formed with a through hole and which is made of an amorphous magnetic alloy having a magnetic flux density of not less than 6 kilogauss at an external magnetic field of 1 oersted, a coercive force of not more than 0.5 oersted, and a squareness ratio of not less than 0.8 when a frequency of said circuit is set to approximately 100 kilohertz, and (b) a conductor wound around the core through the through hole, the conductor being insulated from the core, wherein said amorphous magnetic alloy has a general formula:

$Co_aM_bM'_cY_d$ wherein M is at least one metal element selected from the group consisting of iron and manganese; M' is a transition metal element (excluding iron and manganese); Y is at least one element selected from the group consisting of silicon, boron, phosphorus, carbon, germanium, zinc and aluminum; and a, b, c and d indicate atomic percentages of the respective atoms in the alloy, and $a+b+c+d=100$, $50\leqq a\leqq 80$, $0<b\leqq 10$, $0\leqq c\leqq 10$, and $d=100-(a+b+c)$.

2. A circuit, comprising:

a semiconductor device; and reactor means, coupled in series with said semiconductor device, for restraining current spikes, ringing, and electromagnetic noise in said circuit, said reactor means including a core which has a through hole and which is made of an amorphous magnetic alloy having a magnetic flux density of not less than 6 kilogauss at an external magnetic field of 1 oersted, a coercive force of not more than 0.5 oersted, and a squareness ratio of not less than 0.8 when a frequency of said circuit is set to approximately 100 kilohertz, wherein said amorphous magnetic alloy has a general formula:

$Co_aM_bM'_cY_d$ wherein M is at least one metal element selected from the group consisting of iron and manganese; M' is a transition metal element (excluding iron and manganese); Y is at least one element selected from the group consisting of silicon, boron, phosphorus, carbon, germanium, zinc and aluminum; and a, b, c and d indicate atomic percentages of the respective atoms in the alloy, and $a+b+c+d=100$, $50\leqq a\leqq 80$, $0\leqq b\leqq 10$, $0\leqq c\leqq 10$, and $d=100-(a+b+c)$.

3. A method according to claim 1, wherein said M' is one element selected from the group consisting of chrominum, nickel, niobium, molybdenum, zirconium, tungsten, ruthenium, titanium, vanadium, tantalum, hafnium, rhenium, copper and yttrium.

4. A method according to claim 1, wherein said a, b, c range $55\leqq a\leqq 75$, $2\leqq b\leqq 8$, and $1\leqq c\leqq 8$, respectively.

5. A circuit according to claim 2 wherein said M' is one element selected from the group consisting of chromium, nickel, niobium, molybdenum, zirconium, tungsten, ruthenium, titanium, vanadium, tantalum, hafnium, rhenium, copper and yttrium.

6. A circuit according to claim 2 wherein said a, b, and c range $55\leqq a\leqq 75$, $2\leqq b\leqq 8$, and $1\leqq c\leqq 8$, respectively.

7. A circuit having reduced current spikes, ringing, and electromagnetic noise, comprising:

a semiconductor device; and a reactor connected in series with said semiconductor device, said reactor including: (a) a core having a through hole and made of an amorphous magnetic alloy having a magnetic flux density of not less than 6 kilogauss at an external magnetic field of 1 oersted, a coercive force of not more than 0.5 oersted, and a squareness ratio of not less than 0.8 when a frequency of said circuit is set to approximately 100 kilohertz, wherein said amorphous magnetic alloy has a general formula consisting essentially of:

$Co_aM_bM'_cY_d$ wherein M is at least one metal element selected from the group consisting of iron and manganese; M' is a transition metal element (excluding iron and manganese); Y is at least one element selected from the group consisting of silicon, boron, phosphorous, carbon, germanium, zinc and aluminum; and a, b, c and d indicate atomic percentages of the respective atoms in the alloy, and $a+b+c+d=100$, $50\leqq a\leqq 80$, $0\leqq b\leqq 10$, $0\leqq c\leqq 10$ and $d=100-(a+b+c)$, and (b) a conductor wound on said core, said conductor in series with said reactor.

8. A circuit according to claim 7 wherein said reactor further includes a conductor wound around said core through said through hole, said conductor being insulated from said core.

9. A circuit according to claim 7, wherein said M' is one element selected from the group consisting of chromium, nickel, niobium, molybdenum, zirconium, tungsten, ruthenium, titanium, vanadium, tantalum, hafnium, rhenium, copper and yttrium.

10. A circuit according to claim 7 wherein said a, b and c range $55\leqq a\leqq 75$, $2\leqq b\leqq 8$, and $1\leqq c\leqq 8$, respectively.

11. A method according to claim 1, wherein said electromagnetic noise is at least −22 dB.

12. A method according to claim 11, wherein said electromagnetic noise is substantially −22 dB.

13. A method according to claim 1, wherein said current spikes are at least 0.15 A/4 turns of a coil of said reactor.

14. A method according to claim 13, wherein said spike currents are substantially 0.15 A/4 turns of a coil of said reactor.

15. An apparatus according to claim 2, wherein said electromagnetic noise is at least −22 dB.

16. An apparatus according to claim 15, wherein said electromagnetic noise is substantially −22 dB.

17. An apparatus according to claim 2, wherein said current spikes are at least 0.15 A/4 turns of a coil of said reactor.

18. An apparatus according to claim 17 wherein said current spikes are substantially 0.15 A/4 turns of said coil.

19. A method as in claim 1 wherein there is only one conductor wound on said core.

* * * * *